(12) United States Patent
Snow

(10) Patent No.: US 12,146,614 B2
(45) Date of Patent: Nov. 19, 2024

(54) ROTATABLE X SHAPED FOLDING FLIP GRIP

(71) Applicant: Riley David Snow, Cumming, GA (US)

(72) Inventor: Riley David Snow, Cumming, GA (US)

( * ) Notice: Subject to any disclaimer, the term of this patent is extended or adjusted under 35 U.S.C. 154(b) by 601 days.

(21) Appl. No.: 17/451,930

(22) Filed: Oct. 22, 2021

(65) Prior Publication Data
US 2022/0128194 A1  Apr. 28, 2022

Related U.S. Application Data

(60) Provisional application No. 63/198,506, filed on Oct. 23, 2020.

(51) Int. Cl.
 *F16M 13/04* (2006.01)
 *F16M 13/06* (2006.01)
 *A45F 5/10* (2006.01)

(52) U.S. Cl.
 CPC ............ *F16M 13/04* (2013.01); *F16M 13/06* (2013.01); *A45F 5/10* (2013.01)

(58) Field of Classification Search
 CPC ............ F16M 13/04; F16M 13/06; A45F 5/10
 USPC .............................................. 294/25, 26, 142
 See application file for complete search history.

(56) References Cited

U.S. PATENT DOCUMENTS

| | | | | |
|---|---|---|---|---|
| D780,166 S | * | 2/2017 | Lin | D14/250 |
| 10,244,854 B1 | * | 4/2019 | Haber | H04B 1/385 |
| 10,638,627 B1 | * | 4/2020 | Stime | F16M 11/10 |
| 10,774,871 B1 | * | 9/2020 | Srour | F16C 11/12 |
| D898,036 S | * | 10/2020 | Cheng | D14/440 |
| 11,213,116 B2 | * | 1/2022 | Fleury | A45C 11/00 |
| 11,744,353 B1 | * | 9/2023 | Staten | A45F 5/10 294/26 |
| 11,786,031 B1 | * | 10/2023 | Backus | G06F 1/1626 224/577 |
| 12,016,450 B2 | * | 6/2024 | Backus | A45F 5/10 |
| 2016/0069512 A1 | * | 3/2016 | Grieve | F16M 13/04 294/142 |
| 2020/0063915 A1 | * | 2/2020 | Lederer | F16M 13/04 |
| 2021/0212425 A1 | * | 7/2021 | Wang | F16M 13/022 |

* cited by examiner

*Primary Examiner* — Paul T Chin
(74) *Attorney, Agent, or Firm* — Scott C Harris, Esq

(57) ABSTRACT

A flipgrip system for a phone. The flipgrip includes two hinging legs that unfold into an X shape, and fold flat. A ring adheres to the rear of the phone and a base can snap onto the ring. The base can spin relative to the ring and also be removed from the back of the phone. The first and second legs hinge relative to the base, out into the X shaped position, or in to the folded flat position.

12 Claims, 6 Drawing Sheets

_US 12,146,614 B2_

ROTATABLE X SHAPED FOLDING FLIP GRIP

This application claims priority to provisional application No. 63/198,506, filed Oct. 23, 2020, the entire contents of which are herewith incorporated by reference.

BACKGROUND

Devices are used to allow a user to hold onto a phone in a different way. A typical phone grip, like a pop socket, often attaches to the rear of the phone, and allows holding the phone from the rear.

SUMMARY OF THE INVENTION

The inventor recognized a number of drawbacks with the current systems and has conceived of and describes herein, an improved design.

Current devices such as pop sockets are rigidly attached to the rear of the phone, and are limited in the kinds of movements and operations that they allow.

The present application describes a foldable "x-shaped" phone grip device, called a flipgrip, that attaches to a rear surface of a mobile phone (or other similar device). The flipgrip device has a ring that attaches to the rear of the phone, and a base attaches to the ring. The base has legs that unfold to an x-shape that provides surfaces for gripping the grip device when the legs are unfolded and extended. The flipgrip device is also retractable into a folded position, to take up a minimum amount of room when not in use. The legs of the flipgrip device are locked into the folded position when folded.

The base of the flipgrip device can be snapped on and off of the attached ring, to allow wireless charging of the phone.

The flipgrip device can also be rotated, to allow the phone to be held at different angles.

The flipgrip device has enhanced security and comfort, as described herein.

BRIEF DESCRIPTION OF THE DRAWINGS

In the Drawings.

the drawings show aspects of the invention, and specifically.

DETAILED DESCRIPTION

The present application describes a "flipgrip" device that attaches to the rear of a portable phone, and allows more easy holding of the phone. The flipgrip device is removable, foldable, and rotatable. The flipgrip device is folded to a flat position where it lays flat against the back of the mobile phone. A ring adheres to the rear of the phone, and the base snaps on to the ring. The base has legs that are unfolded to form an X shaped grip device, which has multiple surfaces enabling holding of the phone with a user's hands or fingers.

Figure 1:
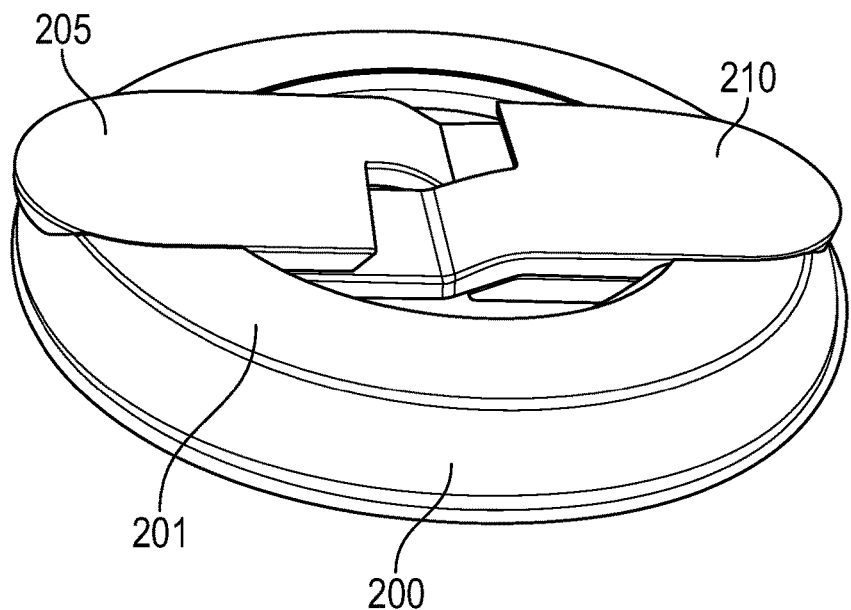
FIG. 1 shows a rear view of the flipgrip device in the folded condition.
Figure 2:
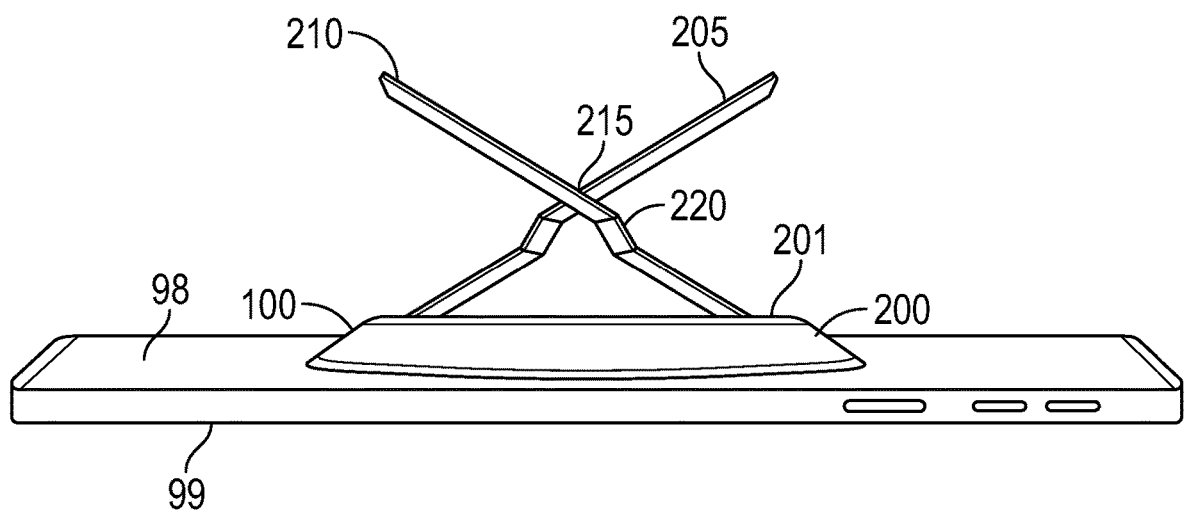
FIG. 2 shows a side view of the flipgrip device as unfolded and attached to a phone.

FIGS. 1 and 2 respectively show the flipgrip device in its folded and unfolded state respectively.

FIG. 2 shows the structure of the flipgrip device, and its configuration when unfolded. The flipgrip device 100 is formed of a round base 200 that attaches to the rear surface 98 of the portable phone 99. A first leg 205 attaches to and hinges relative to a first location on the base 200. A second leg 210 attaches to and hinges relative to the opposite second location of the base 200, which is oppositely facing to the first location. The two legs 205, 210 hinge relative to the base from opposite sides of the base 200. The legs hinge to approximately a 30 to 35° angle relative to the base. The two legs hinge in opposite directions, forming crossing legs that are extended away from the base 200 at an angle. The two legs hinging in the opposite directions contact one another at crossing point 215 which is the location where the legs cross.

When folded as in FIG. 1, the legs 205, 210 are folded down and cover some part of the top surfaces 201 of the base 200. In an embodiment, as described herein, the legs can snap into place when completely folded down.

Figure 3A:
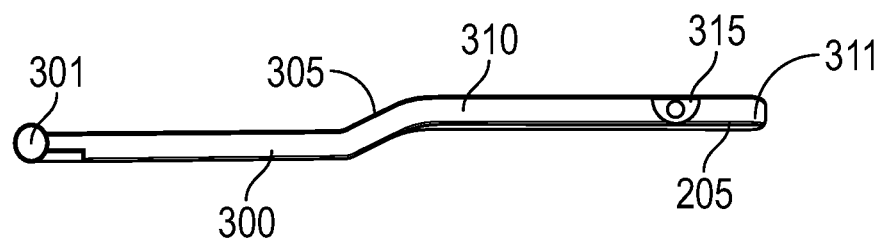
FIG. 3A shows a view of the single leg.
Figure 3B:
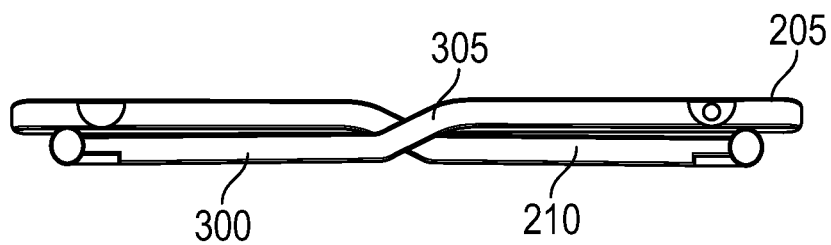
FIG. 3B shows a view of two different legs folded together.
Figure 3C:
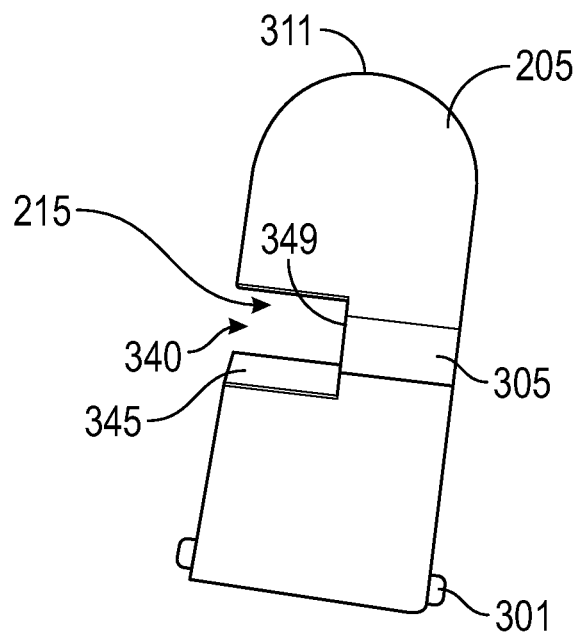
FIG. 3C shows a face on view of the leg, showing the openings in the leg.

FIGS. 3A-3C shows details of the legs, and how they interact with one another.

FIG. 3A shows the leg 205, and shows how it has a first flat section 300, coupled to a 25° angle section 305, and then another flat section 310 which extends parallel to the first flat section at its distal portion. There is also a locking indent 315 near the tip 311 of the distal portion. The locking indent interacts with a corresponding bump on the base (described herein) and the bump fits into the indent to hold the leg in place when folded as described herein.

The legs also include hinging pins 301 which fit into corresponding surfaces in the base 200 to allow the legs to hinge relative to the base.

FIG. 3C illustrates how the legs 205, 210 include an opening 340 at an area just adjacent to the angle section. The opening 340 includes a chamfered section, and enable the legs to interlock with one another, and to sit flat with one another, by interlocking with each leg having a section inside the opening. Crossing point 215, which is the location where the legs cross, is also inside the opening, at an inside surface 349 of the opening. That inside surface 349 of the opening 345 interfaces with the inside surface of the opening of the other leg. The leg sit flat when the chamfered portion 345 of one leg presses against the angle section 305 of the other leg.

In an embodiment, the legs sit flat, as shown in FIG. 1, until the flipgrip device is opened as in FIG. 2. When sitting flat, the legs 205, 210 lay flat against the base and cover edges of the top 201 of the base. The folded flat flipgrip device can have an overall thickness 400 of 5 mm.

Figure 4B:
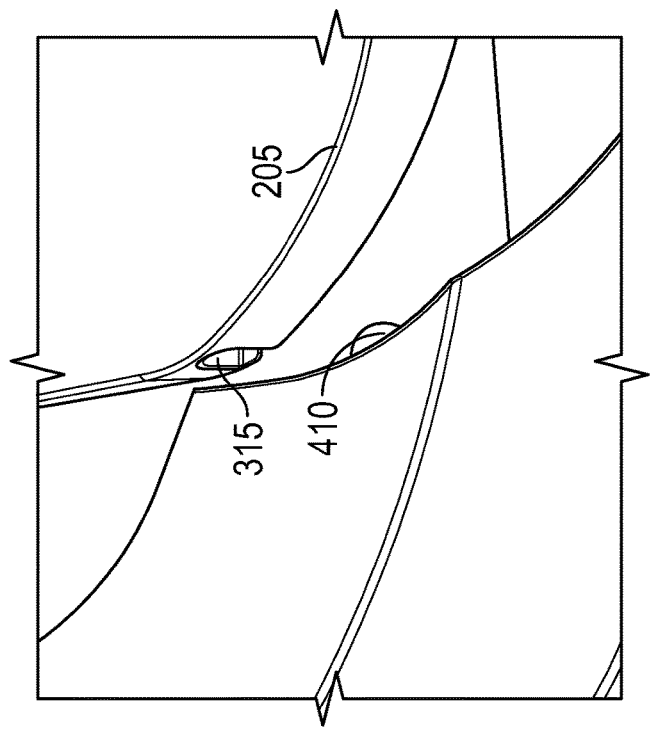
FIG. 4B shows a bump in the base openings.
Figure 4C:
FIG. 4C shows a view showing the lower bump.
Figure 4A:
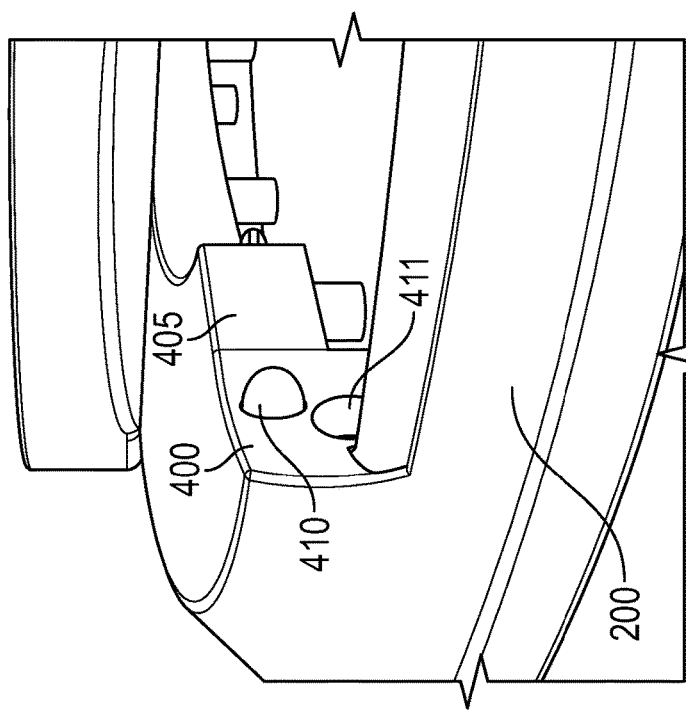
FIG. 4A shows a close-up of the area of the base into which the leg folds.

FIG. 4A illustrates how the base 200 includes an opening section 400 which includes side surfaces 405. Those side surfaces include a bump 410 which is sized to snap into the indentation 315 in the leg. When the leg is placed downward with its edge surfaces against or adjacent the side surfaces of the opening section 400, the bump 410 snaps into the indent 315 in the leg to lock the leg in place.

FIG. 4B shows a detail of the indentation 315 in the leg 205 and how it mates with the bump 410 that is located in the edge surface of the opening. There is also a hinge joint hole 411 that receives the hinge pin of an adjacent leg. The lower bump 451, shown in FIG. 4C creates a springing effect and pushes the leg outward as it glides over it.

Figure 6:
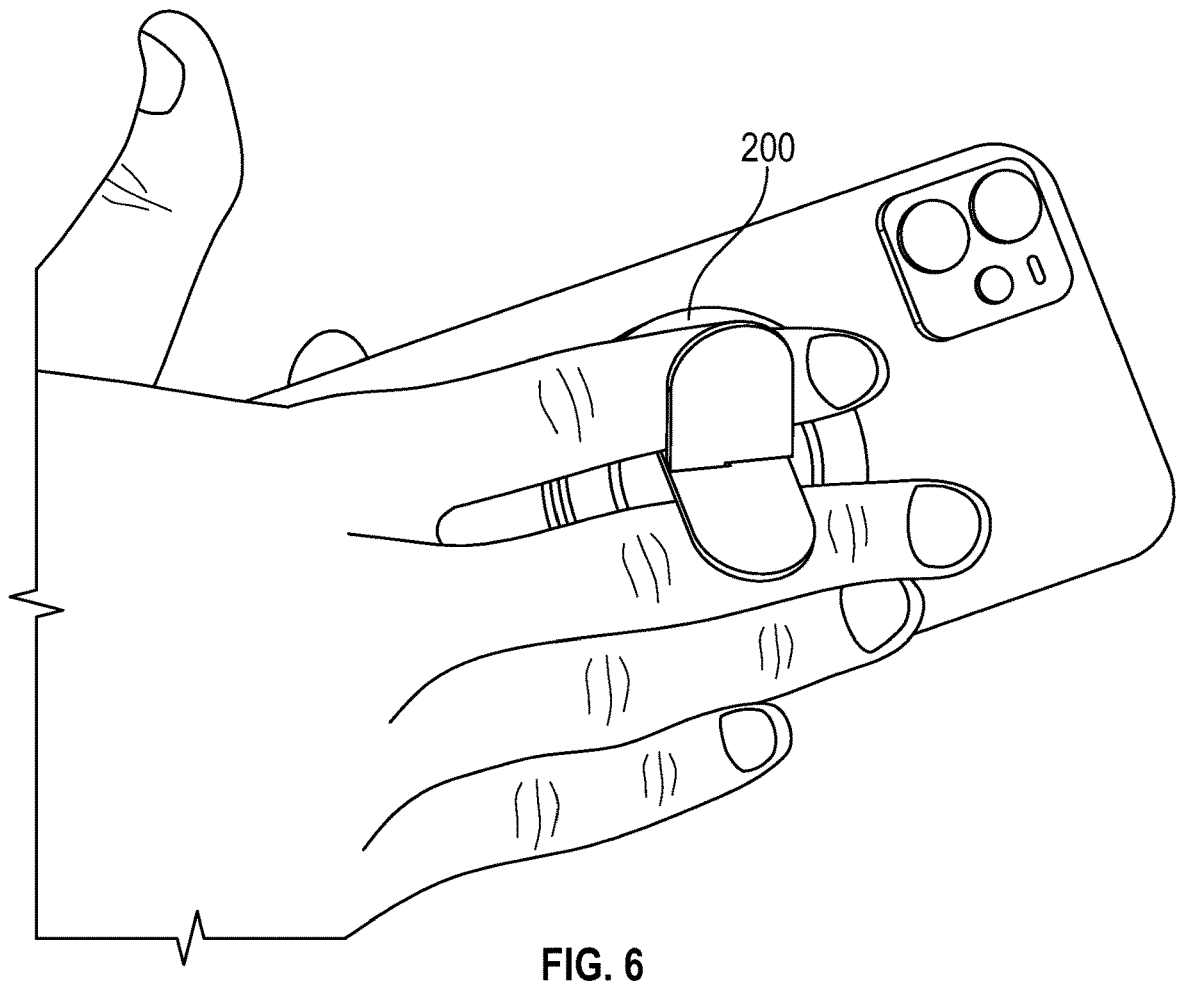
FIG. 6 shows the legs unfolded, and user's fingers resting on the X shape.

When opened, the legs extend from the base 200 at angles, forming a number of surfaces from the crossing of the legs. This allows the user to hold the grips by the two legs 205, 210 as shown in FIG. 6.

The legs can also be used as a kickstand, where the tip 311 of the leg 205 can rest against the ground, thus holding the phone 99 up at an angle. The lower bump 451 keeps the legs rigid in this position by pushing the legs outward.

Figure 5A:
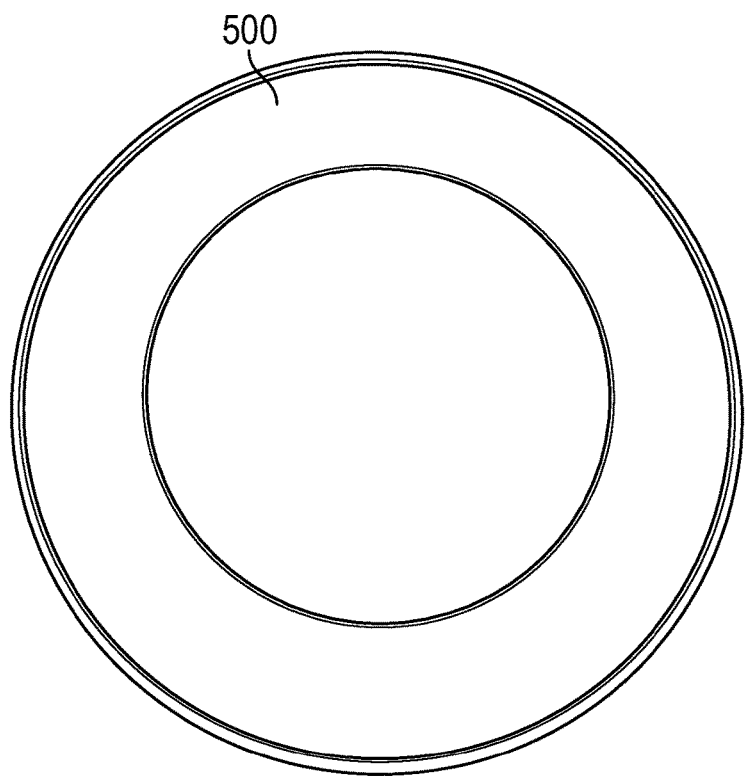
FIG. 5A shows a view of the ring that attaches to the phone, or phone case.
Figure 5B:
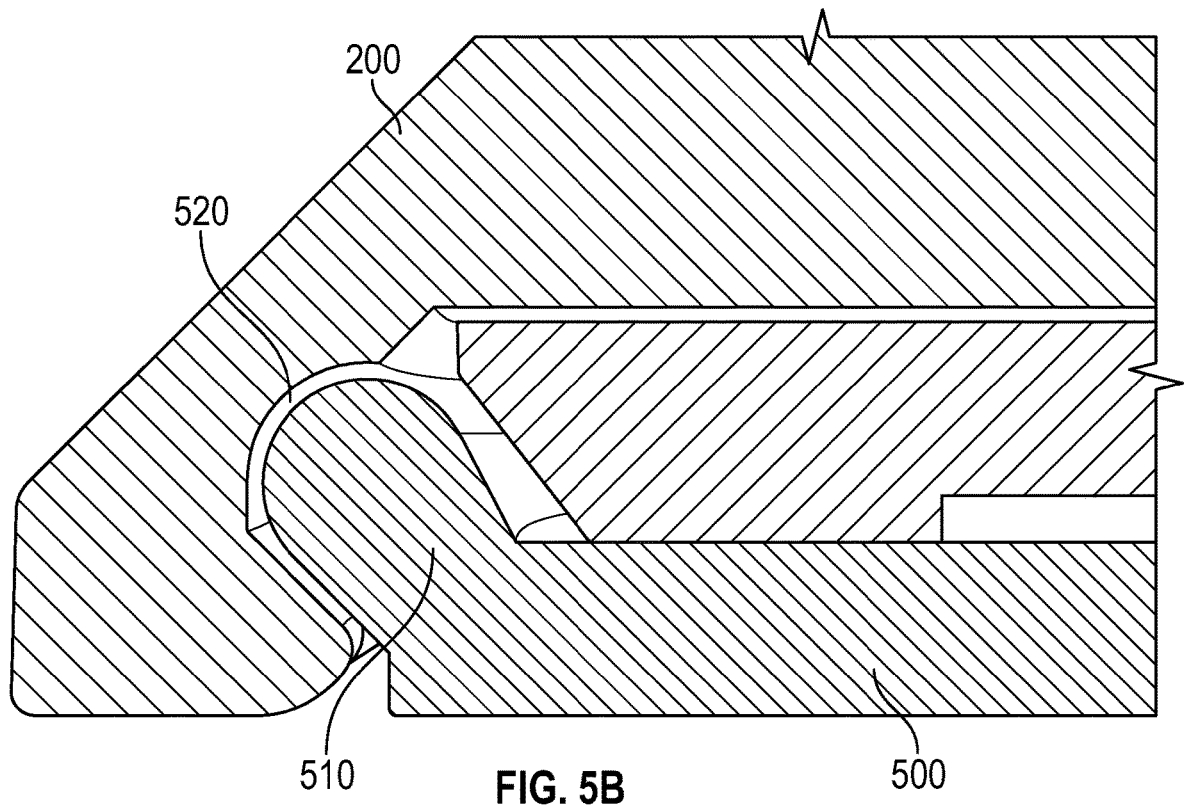
FIG. 5B shows a cross-section of the ring part attached to the base.
Figure 7A:
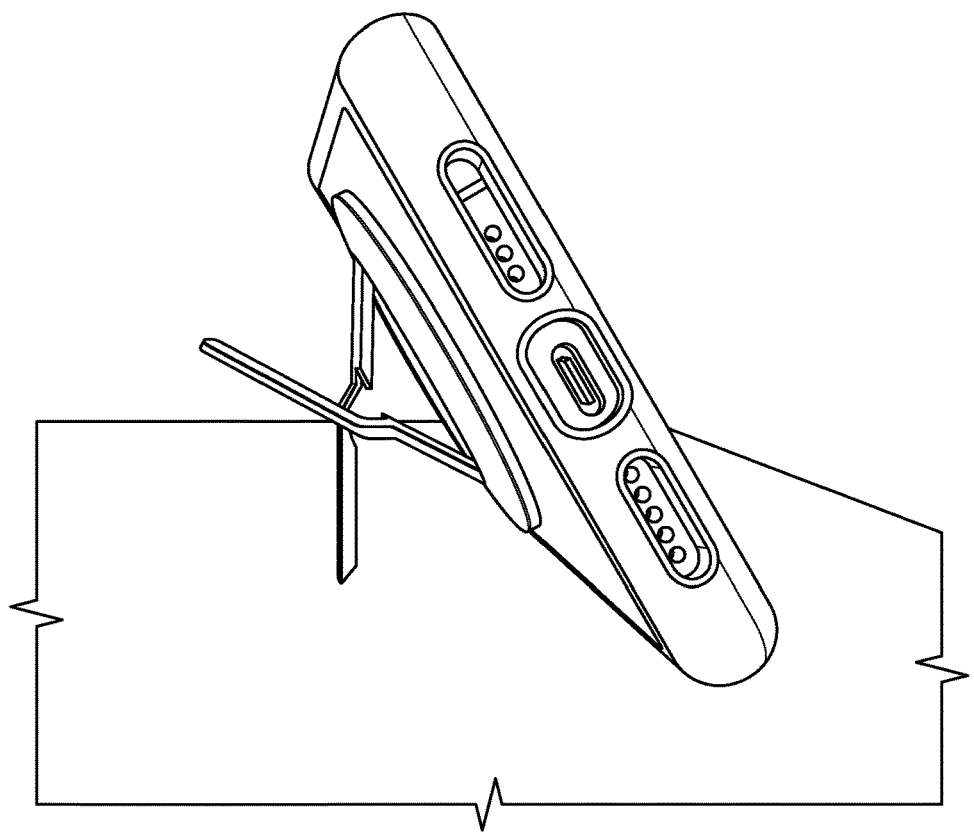
FIG. 7A shows the legs forming a kickstand in a first configuration.
Figure 7B:
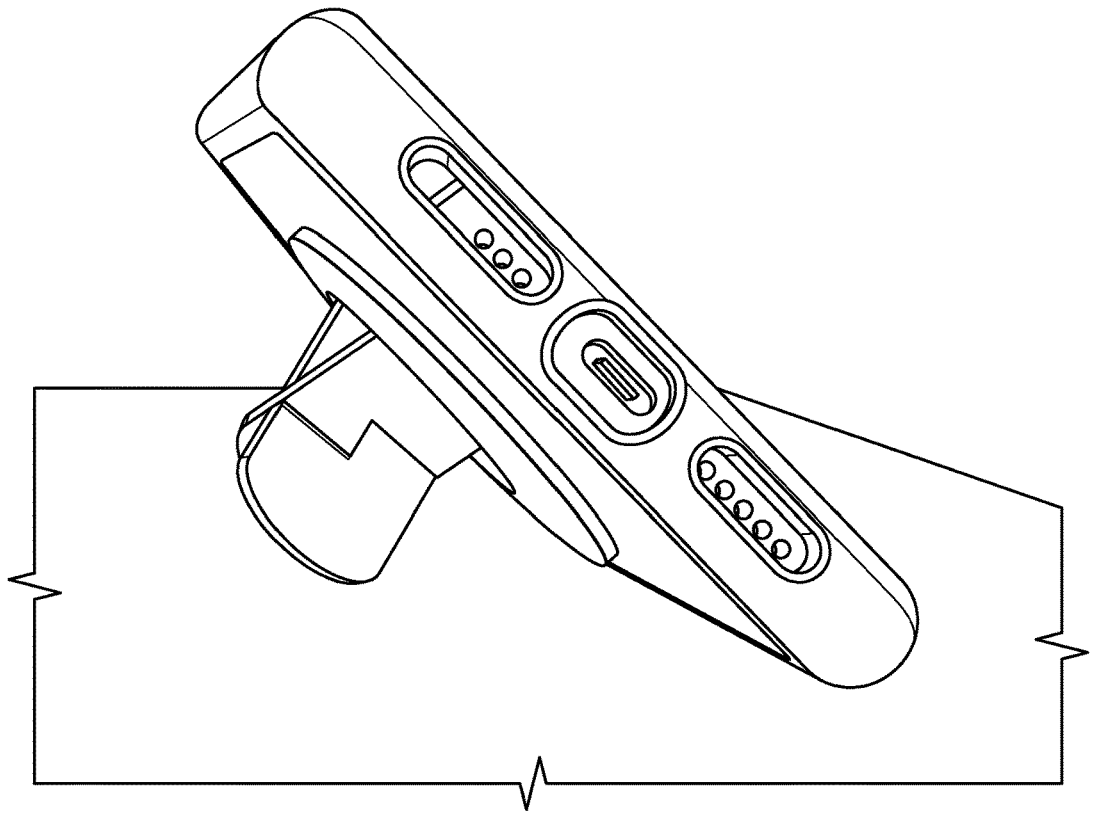
FIG. 7B shows the legs rotated relative to FIG. 7B to show the kickstand in a second configuration.

The base 200 is formed of two seperable parts, including an attachment ring 500 shown in FIG. 5A that attaches to the phone. The attachment ring 500 is a plastic ring that adheres to the back of the phone. The ring is contoured at its edge, as shown in the cross section of FIG. 5B. This contoured edge 510 fits into a corresponding socket 520 in the base. The base 200 thus removably snaps on to the attachment ring 500. The snap on base part pops on and off with a prying motion. The snap connection onto the attachment ring allows the base part to rotate relative to the attachment ring, and hence to rotate relative to the phone. This allows the base part, and hence the legs, to rotate, so that the legs can hold as a kickstand in different configurations, including the higher-holding configuration shown in FIG. 7A, and then spun to the lower-holding configuration in FIG. 7B, as well as all positions in between, since the Piece can be rotated.

Figure 5C:
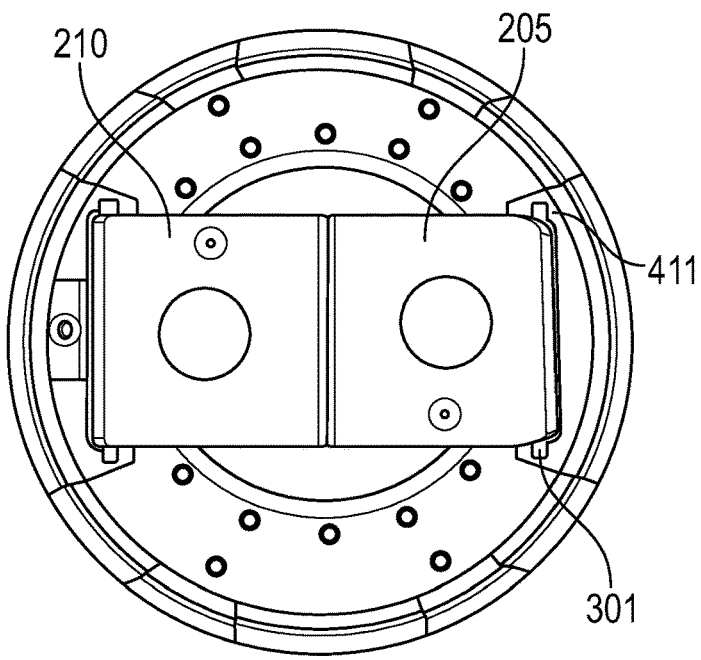
FIG. 5C shows how the legs attach into the base.

FIG. 5C illustrates how the folded legs fit into the base, and how the hinge pins 301 fit into corresponding openings 411 on the base.

The bottom ring 500 is about 2 mm thick when the base 200 is removed. This allows wireless charging of the phone with the bottom ring attached.

The grip of the embodiment has enhanced security and comfort. For example, gripping a popsocket requires that device to be wedged between a user's fingers. The user squeezes their fingers together to grip the phone which can be uncomfortable. The inventor believes also that the popsocket design is not secure and does not prevent drops effectively. In contrast, the X shaped design of the flipgrip (when viewed from the side profile) allows the user to press downward on the grip rather than squeezing their fingers together, which is a more natural and comfortable gripping motion. The X shaped design is also more secure than the popsocket and prevents phone drops more effectively.

In operation, the entire unit is made of plastic, with the base part, and the legs being formed in any desired color.

In another embodiment, other accessory products can be snapped in to the base such as multi-surface mounts, car-vent mounts, desk stands, and wireless chargers.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A grip device for attaching to a portable device, comprising:
a base, attached to a surface of the portable device, the base having a first surface at a first location and a second surface at a second location;
a first leg, attached to the first location of the base, and foldable relative to the base in a first direction;
a second leg, attached to the second location of the base, and foldable relative to the base in a second direction opposite to the first direction;
wherein the first and second legs have surfaces that interact with one another, and hold the first and second legs at their maximum unfolded position, preventing the legs from unfolding more than the maximum unfolded position when unfolded, and where the first and second legs fold flat against one another when folded.

2. The grip device as in claim 1, wherein the first and second legs unfold into an X shape.

3. The grip device as in claim 2, wherein each of the first and second legs have an indented part, an indented part of the first leg moves next to an indented part of the second leg when unfolding, and the indented parts of the first and second legs hold against on another to hold the legs open in the x shape.

4. The grip device as in claim 3, wherein each of the first leg and the second leg include chamfered stop surfaces, where the stop surface on the first leg presses against the stop surface on the second leg to prevent unfolding of the legs by more than a first amount.

5. The grip device as in claim 4, where the first leg and the second leg touch one another at the respective stop surfaces, thus forming the X shape.

6. The grip device as in claim 1, wherein the base attaches to the portable device via a connection that allows spinning the base relative to the portable device.

7. The grip device as in claim 6, further comprising a ring attaching to a surface of the portable device, and wherein the ring includes a snap surface, and where the base includes snap surfaces that snap on to the snap surfaces of the ring.

8. The grip device as in claim 1, wherein the legs each have a first flat section, coupled to an angled section, and then to another second flat section which extends parallel to the first flat section.

9. The grip device as in claim 8, wherein the angled sections extend at 25° relative to the flat section.

10. The grip device as in claim 8, wherein the legs lay flat against one another, with the first flat section of one of the legs pressing against the second flat section of the other of the legs.

11. The grip device as in claim 1, further comprising a locking indent on the legs, which locks the legs into a corresponding bump on the base.

12. A grip device for attaching to a portable device, comprising:
a base, attached to a surface of the portable device;
a first leg, hinged to the base, and foldable relative to the base in a first direction;
a second leg, hinged to the base, and foldable relative to the base in a second direction opposite to the first direction;
where each of the first and second legs have a first flat portion, a second angled portion extending at an angle relative to the first flat portion, and a third flat portion, extending parallel to the first flat portion, wherein the first and second leg open into an X shaped configuration, and have surfaces that hold the first and second legs at their maximum unfolded position, preventing the legs from unfolding more than the maximum position when unfolded;

and where the first and second legs fold flat against one another, with the first flat portion of the first leg pressing against the third flat portion of the second leg, and the first flat portion of the second leg pressing against the third flat portion of the first leg.

* * * * *